UNITED STATES PATENT OFFICE.

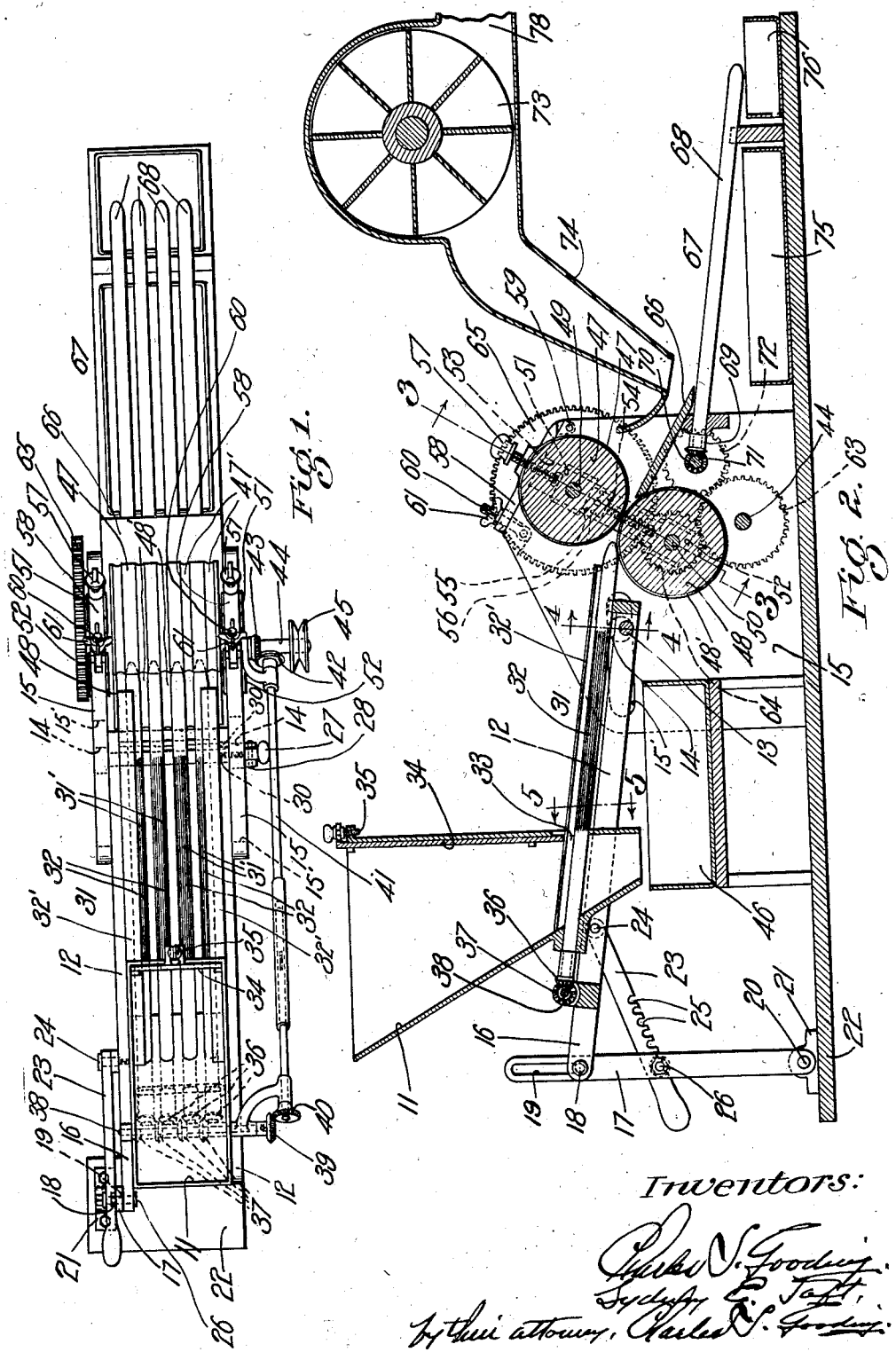

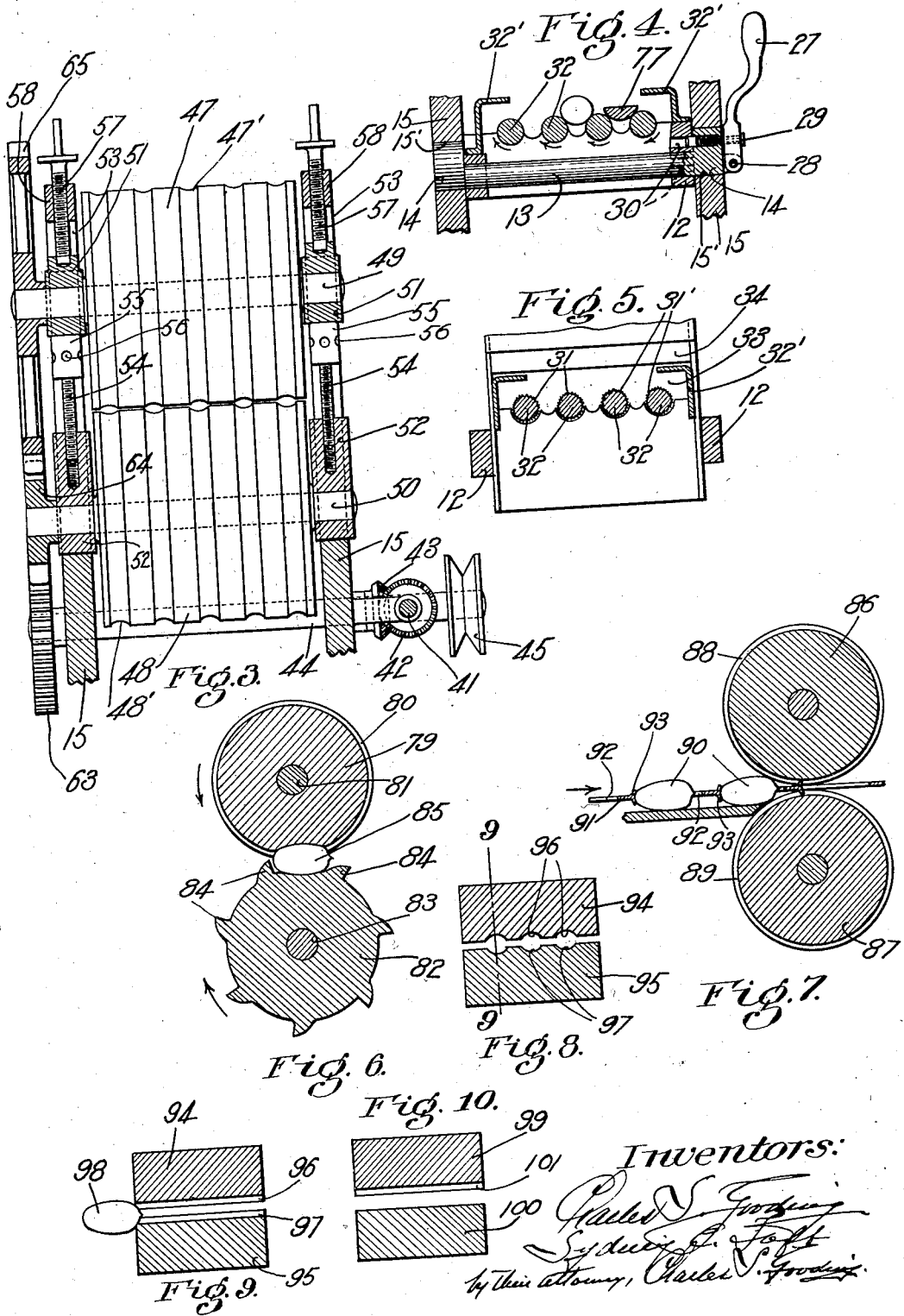

CHARLES S. GOODING, OF BROOKLINE, AND SYDNEY E. TAFT, OF FRAMINGHAM, MASSACHUSETTS.

MACHINE FOR BLANCHING NUT-KERNELS.

1,322,300.

Specification of Letters Patent. Patented Nov. 18, 1919.

Application filed May 5, 1917. Serial No. 166,708.

*To all whom it may concern:*

Be it known that we, CHARLES S. GOODING, a citizen of the United States, residing at Brookline, in the county of Norfolk, and SYDNEY E. TAFT, a citizen of the United States, residing at Framingham, in the county of Middlesex, both in the State of Massachusetts, have invented new and useful Improvements in Machines for Blanching Nut-Kernels, of which the following is a specification.

This invention relates to a machine for blanching nut kernels, that is, a machine which is adapted to remove the skins from the nut kernels, and particularly peanut kernels. In mechanism of this character it is very necessary that there should be as few "splits" as possible and also that the skins should be cleanly removed from the peanut kernels. Moreover, as the peanut kernels with the skins thereon are received from the roasting machine, there is liable to be a number of "splits" among the whole kernels, and it is desirable to separate these "splits" from the whole kernels, as the price for the whole peanut kernels is very much greater than that for a mixture of the whole kernels and "splits."

It is the object of this invention not only to remove the skins from the peanut kernels, but also to separate the skins from the whole peanut kernels and to separate the "splits" from the whole peanut kernels.

The invention consists in the combination and arrangement of parts set forth in the following specification and particularly pointed out in the claims thereof.

Referring to the drawings:

Figure 1 is a plan view of a peanut blanching machine embodying one form of our invention.

Fig. 2 is a sectional elevation of the same, partly broken away.

Fig. 3 is an enlarged sectional elevation taken on line 3—3 of Fig. 2.

Fig. 4 is a sectional elevation taken on line 4—4 of Fig. 2.

Fig. 5 is a sectional elevation taken on line 5—5 of Fig. 2.

Fig. 6 is a transverse section illustrating a modified form of blanching rolls.

Fig. 7 is a transverse section illustrating a modified form of means for feeding the peanut kernels between a pair of rolls.

Fig. 8 is a modified form of blanching device.

Fig. 9 is a section taken on line 9—9 of Fig. 8.

Fig. 10 is a sectional view similar to Fig. 9 of a modified form of device for blanching peanut kernels.

Like numerals refer to like parts throughout the several views of the drawings.

In the drawings, referring to Figs. 1 to 5 inclusive, 11 is a hopper adapted to contain a mass of peanut kernels, both split and whole, some with the skins on and some with them off, said hopper being fastened to a tilting frame 12 which is pivoted upon a rod 13. The rod 13 has a pair of hubs 14 thereon which are eccentric thereto and these hubs are rotatably mounted in the side standards of the main frame 15 and slidable in slots 15' in said frame.

The opposite end of the tilting frame 12 is provided with an arm 16 which is fastened to a standard 17 by means of a bolt 18 which extends through a slot 19 in said standard, whereby the arm 16 at that end may be raised and lowered and clamped in position. The standard 17 is pivoted at 20 to a bracket 21 on the base 22 of the machine.

A brace 23 is pivoted at 24 to the tilting frame 12 and is provided with a series of notches 25 which are adapted to engage a pin 26 on the standard 17 and lock the tilting frame 12 at different inclinations. The lower end of the tilting frame 12 may be adjusted vertically by means of a handle 27 pivoted at 28 to one of the hubs 14 and having a spring-actuated pin 29 connected thereto and extending through said hub 14 into a recess 30 provided in the tilting frame 12. By rocking the handle 27 upon its pivot 28, the pin 29 may be withdrawn from the recess 30 in the frame 12 and then by rotating the handle 27 the hubs 14 and the eccentric shaft 13 will be rotated, thus raising or lowering the lower end of the frame 12 with the parts supported thereon. A series of recesses 30 are provided in the tilting frame 12 concentric with the rod 13, so that said pin 29 may lock the hub 14 to the frame 12 in any of its adjusted positions.

The whole peanut kernels are separated from the "splits" by means of a separator 31, consisting of a series of parallelly disposed rods 32, preferably inclined and passing through the bottom of the hopper 11 and separated from each other by spaces less than the diameter of a peanut and greater than the smallest thickness of a split peanut, so that a "split" can pass through between two adjacent rods and a whole peanut cannot. The rods 32 are preferably provided with corrugations 31' upon their peripheries extending longitudinally thereof for a portion of their length, said corrugations terminating at a substantial distance from the rolls 47 and 48, hereinafter described, and preferably extending through the hopper 11. Immediately above said rods there is an outlet 33, the height of which may be regulated by a slide 34 mounted upon the hopper 11 and adjusted vertically thereon by means of an adjusting screw 35. The rods 32 are rotated all in the same direction by bevel gears 36 attached thereto and meshing into bevel gears 37 on a shaft 38 extending transversely of said rods and to which a rotary motion is imparted by means of bevel gears 39 and 40.

The bevel gear 40 is rotated by means of an extensible shaft 41 which, in turn, is rotated by means of a bevel gear 42 which meshes into a bevel gear 43 fast to the main driving shaft 44. The main driving shaft 44 is rotated by any suitable means, such, for example, as by a pulley 45.

The whole peanuts are prevented from falling over the two outside rods 32 by guides 32', Fig. 4. These guides are preferably angle-shaped and are fastened to the frame 12, extending upwardly therefrom and having their upper sides projecting above the outermost rods 32 and separated from said rods by a space substantially equal to that between the rods 32, the object of this construction being that when any whole peanuts mount upon the outermost rods they are prevented from passing off of said rods by said guides, but if a split peanut mounts the outermost of said rods it will pass between the guides 32' and the rod and drop off into a receptacle or bin 46.

The bin 46 is placed beneath the separator 31 to receive the "splits" as they drop from the rods thereinto. The whole peanut kernels travel down the separator rods 32 and pass between a pair of blanching rolls 47 and 48. These blanching rolls are preferably provided with annular grooves 47' and 48' in alinement with each other, and the spaces between the rods 32 are in alinement with the grooves 47' and 48'.

These blanching rolls are made of a yielding material and we have found the most suitable material to be one containing a percentage of glycerin or molasses and glue, said material being similar to that used in printers' rolls and for several reasons this has been found to be true. First, it is necessary to make the rolls of yielding material so that the peanut kernels as they pass between the rolls can sink into the rolls, that is, the rolls will have a capacity of individual or local yielding to accommodate peanut kernels of different diameters and lengths. Another reason why this particular material is efficacious in a machine of this character is that it does not deteriorate by reason of oil coming in contact therewith, and more or less oil will come in contact with the blanching rolls in a machine of this character, as the peanut kernels themselves contain peanut oil. Another advantage inherent in rolls made of this material for this particular purpose is that they can be rendered more or less sticky upon their peripheries, viz., by wetting the same to render them more sticky or by powdering the same to render them less sticky, so that in this instance the material of which the blanching rolls is made is an important factor in the efficiency and practicability of the machine.

The rolls 47 and 48 are fast to shafts 49 and 50, respectively, which are rotatably mounted in bearing boxes 51 and 52, these boxes being slidable in ways 53 formed in the side standards 15 of the machine. The boxes 52 are provided with adjusting screws 54 which have screw-threaded engagement therewith and which have heads 55 thereon provided with holes 56, whereby the same may be adjusted by means of a spanner wrench. The heads 55 of said screws bear against the under side of the boxes 51 and thus the distance between the rolls 47 and 48 may be regulated. The boxes 51 are held against the screws 55 by adjusting screws 57 which have screw-threaded engagement with caps 58. The caps 58 are pivotally mounted at 59 upon side standards 15 and are held in working position with the screws 57 bearing against the bearing boxes 51 by clamp-bolts 60 and thumb-screws 61, the clamp-bolts 60 being pivoted at 62 to the side standards of the machine. This construction is to enable the rolls to be quickly and easily removed from the side frames of the machine when it is desired to clean them or to put them in position to cool in hot weather when the machine is not being used or to have them replaced.

A rotary motion is imparted to the rolls 47 and 48 by a gear 63 which is fast to the main driving shaft 44 and meshes into a gear 64 fast to the shaft 50 to which the lower roll 48 is attached, and the gear 64 meshes into a gear 65 fast to the shaft 49 of the upper roll. It will be noted that the gear 64 is of very much less diameter than the gear 65, and the object of this relative size of the two gears which drive the rolls is to cause one of said rolls to be moved at a greater speed than the other, so that the peripheries of the rolls 47 and 48 will move at different speeds relatively to each other, thus causing a rubbing action to take place upon the skin of the peanut kernel which is passing between the rolls and whereby said skin is removed from the peanut kernel.

The peanut kernels pass from between the rolls with their skins removed down a chute 66 which directs them to another separator 67 similar in its operation to the separator 31 and consisting of a series of rods 68 which are operated by means of the bevel gears 69 fast thereto and meshing into bevel gears 70 which are fast to a shaft 71, said shaft 71 having a gear 72 fastened thereto which meshes with the gear 63 on the main shaft 44.

A suction blower 73, with a spout 74 terminating adjacent to the separator 67 and chute 66, serves to remove the skins which have been separated from the peanut kernels while the peanut kernels and whatever "splits" there may be pass onto the separator 67 and the "splits," if any such there be, pass between the rods 68 of the separator 67 into a bin 75, while the whole peanut kernels pass into a bin 76 located beneath the ends of the separator rods 68.

The general operation of the mechanism hereinbefore specifically and to some extent in general described is as follows: Peanut kernels in mass, including peanut kernels with the skins on and peanut kernels with the skins off, split peanut kernels and skins separated from the peanut kernels are placed in the hopper 11 and rest upon the rods 32 of the separator 31. These rods all rotating in the same direction cause one side of a split peanut kernel 77 (see Fig. 4) to be moved upwardly and the other side of said split peanut kernel to be moved downwardly, thus rotating the split peanut kernel until the flat portion of the same becomes vertical and the same drops through the space between the rods. A whole peanut kernel will be rotated in the same manner but will not pass through between the rods as its diameter is too great. Therefore, the split peanut kernels pass through between the rods of the separator and into the bin 46, while the whole peanut kernels pass from the hopper 11 through the outlet 33 and pass down the inclined rods 32 and off of the ends thereof and between the rolls 47 and 48 in the grooves 47' and 48'.

It is evident that the quantity of peanuts which may pass from the hopper through the outlet 33 and downwardly along the inclined rods 32 may be increased or diminished, as desired, by raising or lowering the slide 34, whereby the height of the outlet 33 may be respectively increased or diminished.

In order to assist in the rotation of the peanut kernels as they pass along the rods of the separator, as hereinbefore described, the rods 32 are provided with corrugations 31' in their peripheries extending longitudinally thereof, preferably from the hopper to a point at a substantial distance from the rolls 47 and 48.

The roll 47 moving at a much less speed than the roll 48, the periphery of the roll 47 will move at less speed than the periphery of the roll 48 and thus the roll 48 will feed the peanut kernel through, while the roll 47 will coact with the roll 48 to strip the skin from the peanut kernel. The peanut kernel with the skin stripped off will then move out from between the rolls onto the chute 66 which will guide the peanut kernels down, both whole and split, if any such there be, onto the separator 67, and the few split peanut kernels contained in the mass which comes from the rolls will drop between the rods 68 of said separator and into the bin 75, said rods 68 tipping the split peanut kernels in order to dump the same into the bin 75 in the same manner as the rods 32 tip the split peanut kernels to dump them into the bin 46. The whole peanut kernels pass along the rods 68 and are fed by said rods, which are preferably inclined, into the bin 76.

The skins from the peanut kernels are drawn by the suction blower 73 up through the spout 74 and delivered through the outlet 78 into any desired receptacle.

If it is desired to change the inclination of the separator rods 32, it may be done by raising the bolt 18 in the slot 19 and locking it in the new position, or the ends of the rods adjacent to the rolls 47 and 48 may be adjusted vertically by means of the handles 27, whereby the rod 13 may be rotated and locked in different positions by means of the pins 29, as hereinbefore described. If it is desired to move the rods 32 longitudinally thereof away from the rolls 47 and 48, in order that the roll 48 may be removed from the machine, it may be accomplished by lifting the brace 23 out of contact with the pin 26 and moving the frame 12, together with the hopper 11 and the rods 32, toward the left (Fig. 2) whereupon the rods 14 will slide in the slots 15' and the ends of the rods 32 will thus be moved bodily away from the rolls 47 and 48, leaving said rolls free to be removed from the frame for any desired purpose.

In Fig. 6 a modified form of our invention is illustrated, in so far as the blanching rolls are concerned, the same consisting of an upper roll 79 provided with an annular groove 80 and fast to a shaft 81, and a lower roll 82 which is fastened to a shaft 83 and has projections or teeth 84 adapted to engage a peanut kernel 85 and feed the same through between the two rolls. In this case the upper roll will rotate at a slower speed than the lower roll as in the case of the blanching rolls 47 and 48 hereinbefore described. The rolls 79 and 82 are also preferably formed of yielding material.

In Fig. 7 another modified form of our invention is disclosed in which the blanching rolls 86 and 87 are provided with grooves 88 and 89 and the peanut kernels 90 are fed between said rolls by means of a continuous belt 91 moving in the direction of the arrow and having holes 92 therein to receive said peanut kernels which will be pushed through between the rolls 86 and 87 by flanges 93 on said continuous belt. In this case the rolls 86 and 87 may be stationary, or one of said rolls may be stationary and the other movable during the operation of the machine, or both of said rolls may be rotated as in the form of rolls hereinbefore described in relation to Figs. 1 to 5 inclusive. In case the rolls 86 and 87 are made stationary, or either of them, they may be rotated by hand from time to time to cause a new portion of the periphery of the rolls to contact with the peanut kernels, while the portion of said periphery which has been contacting with said peanut kernels may thus be freed of any peanut kernel skins which may have adhered thereto.

Figs. 8 and 9 disclose another modified form of our invention consisting of two oppositely disposed members 94 and 95, each provided with grooves 96 and 97. These oppositely disposed members are held in any suitable frame and are preferably formed of a material similar to that described in relation to the rolls of the machine illustrated in Figs. 1 to 5 inclusive. The peanut kernels 98 are pushed along the grooves 96 and 97 between the members 94 and 95 by any suitable mechanism and the skins thus removed.

Fig. 10 shows still another modified form of our invention consisting of two members 99 and 100 formed of yielding material and one of said members having a groove 101 in the surface thereof which is adjacent to the other member 100. The peanut kernel is passed between these members 99 and 100 following the groove 101 and the skin is thus removed therefrom.

Having thus described our invention, what we claim and desire by Letters Patent to secure is:

1. A device for blanching nut kernels having, in combination, a pair of rolls with yielding peripheries, an annular groove in each of said rolls, said grooves being disposed in alinement with each other, and means to rotate said rolls at different speeds, whereby a kernel may be fed therebetween and the skin removed therefrom.

2. A device for blanching nut kernels having, in combination, a pair of rolls with yielding peripheries, means to rotate one of said rolls, means to guide a kernel between said rolls comprising two parallelly disposed rods with their ends tapered and terminating adjacent to said rolls and mechanism adapted to impart a rotary motion to said rods.

3. A device for blanching nut kernels having, in combination, a pair of rolls with yielding peripheries, means to rotate one of said rolls, means to guide a kernel between said rolls comprising two parallelly disposed rods with their ends terminating adjacent to said rolls, and mechanism adapted to impart a rotary motion to said rods in the same direction.

4. A machine for blanching nut kernels having, in combination, a pair of rolls with yielding peripheries, mechanism adapted to rotate said rolls at different speeds, a pair of parallelly disposed rods disposed substantially at right angles to the axes of said rolls and terminating between said rolls and mechanism adapted to impart a rotary motion to said rods in the same direction.

5. A machine for blanching nut kernels having, in combination, a hopper, a pair of rolls with yielding peripheries, mechanism adapted to rotate said rolls at different speeds, a pair of rods disposed substantially at right angles to the axes of said rolls, said rods extending across the bottom of said hopper and terminating in tapered ends between said rolls and mechanism to rotate said rods in the same direction.

6. A machine for blanching nut kernels having, in combination, a pair of rolls with yielding peripheries, mechanism adapted to rotate one of said rolls faster than the other, a hopper, means interposed between said hopper and rolls adapted to separate the whole kernels from the "splits" and feed said kernels to said rolls, and other separating means located adjacent to said rolls and adapted to separate the whole kernels from the "splits" after the kernels have passed between said rolls.

7. A device for blanching nut kernels having, in combination, a pair of rolls having yielding peripheries formed of material including glycerin and glue, means to rotate one of said rolls, means to guide a kernel between said rolls comprising two parallelly disposed rods provided with tapered ends, said ends terminating adjacent to said rolls and means to adjust said tapered ends to different positions relatively to said rolls.

8. A device for blanching nut kernels having, in combination, a pair of rolls with yielding peripheries, means to rotate one of said rolls, means to guide a kernel between said rolls comprising two parallelly disposed rods with their ends terminating adjacent to said rolls, and means to move said rods longitudinally thereof away from said rolls.

9. A device of the character described having, in combination, a plurality of parallelly disposed rods with spaces therebetween, means adapted to rotate said rods in the same direction and a pair of guide plates extending along the upper sides of the two outermost rods of said plurality of rods, the inner edges of said plates lying substantially parallel with and directly above the axes of said outermost rods, with a space between the upper sides of said rods and said guide plates substantially equal to the space between a pair of said parallelly disposed rods.

10. A machine for blanching nut kernels having, in combination, a pair of rolls with yielding peripheries, mechanism adapted to rotate said rolls at different speeds and a pair of parallelly disposed rods terminating between said rolls, said rods having corrugations in the peripheries thereof extending longitudinally thereof for a portion of their length, said corrugations terminating at a substantial distance from said rolls.

In testimony whereof we have hereunto set our hands.

CHARLES S. GOODING.
SYDNEY E. TAFT.